(12) United States Patent
Bay

(10) Patent No.: US 7,020,104 B2
(45) Date of Patent: Mar. 28, 2006

(54) SYSTEM AND METHOD FOR INDIVIDUALIZED BROADCASTS ON A GENERAL USE BROADCAST FREQUENCY

(75) Inventor: Fm Bay, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 890 days.

(21) Appl. No.: 09/904,911

(22) Filed: Jul. 16, 2001

(65) Prior Publication Data

US 2003/0012153 A1 Jan. 16, 2003

(51) Int. Cl.
*H04B 7/185* (2006.01)

(52) U.S. Cl. ...................... 370/316; 370/320

(58) Field of Classification Search ............... 370/316, 370/320, 326, 335, 342, 315, 390, 441, 432, 370/343, 310; 455/12.1; 725/63, 71
See application file for complete search history.

(56) References Cited

U.S. PATENT DOCUMENTS

| | | | |
|---|---|---|---|
| 4,839,656 A | | 6/1989 | O'Neill et al. |
| 5,594,780 A | * | 1/1997 | Wiedeman et al. ......... 455/430 |
| 5,966,371 A | * | 10/1999 | Sherman ..................... 370/320 |
| 5,977,909 A | | 11/1999 | Harrison et al. |
| 5,995,497 A | * | 11/1999 | Gerakoulis .................. 370/320 |
| 6,128,332 A | * | 10/2000 | Fukawa et al. ............. 375/146 |
| 6,128,469 A | | 10/2000 | Zenick, Jr. et al. |
| 6,144,654 A | | 11/2000 | Ibanez-Meier et al. |
| 6,188,767 B1 | | 2/2001 | Needham et al. |
| 6,396,819 B1 | | 5/2002 | Fleeter et al. |
| 6,594,469 B1 | * | 7/2003 | Serri et al. ................. 455/12.1 |

* cited by examiner

*Primary Examiner*—Ajit Patel
(74) *Attorney, Agent, or Firm*—Swidler Berlin LLP

(57) ABSTRACT

A system and method of individualizing a general broadcast by combining a user identifier with a message and encoding the combination with a user specific code. Also, source identifiers can be added to the encoded combination, and the result again encoded and broadcast via a general broadcast system.

16 Claims, 5 Drawing Sheets

SYSTEM AND METHOD FOR INDIVIDUALIZED BROADCASTS ON A GENERAL USE BROADCAST FREQUENCY

BACKGROUND OF THE INVENTION

General broadcasting systems are designed and function to broadcast a message to multiple receivers so that each of the receivers receives the same message. Well known examples of general broadcast systems include systems such as the Global Positioning System ("GPS") and satellite TV. Both of these example systems broadcast non user specific messages to a vast array of receivers. An inexpensive GPS receiver, for example, receives broadcast messages from a number of satellites. None of the GPS satellite transmissions can be targeted to any specific receiver. Similarly, in a satellite TV system, a satellite broadcasts to multiple receivers. As with the GPS system, the satellite TV broadcasts lack the ability to target individual receivers with user specific message. Generally, general broad cast systems do not have the ability to target a message to an individual receiver.

In the case of a GPS system, the dedicated frequencies for GPS broadcasts are currently used for position and timing data transmissions. This is in accordance with the system as it was originally conceived and designed. Recently, there has been a decision to add a new military code, the m-code, to the GPS L1 and L2 frequencies. This new code would provide military specific messages, but not individual user specific messages. In addition to this military code, a new frequency is being added to the GPS architecture. The new frequency will be a dedicated civilian frequency, L5. The current plans for the L5 frequency are for civilian use only.

One approach to providing user specific information via a GPS broadcast, is to restrict to user dependent information. One example of such a restriction would be to broadcast a series of user specific information messages. A specific user would have to receive, in sequence, each of the messages intended for other users before receiving the appropriate message. For example localized weather broadcasts could be made. However, someone on the East Coast would need to wait until the weather for other regions (e.g., west, mountain and central regions) had been broadcast before receiving the East Coast weather broadcast. The utility of such a user specific approach is very limited because of the necessity of waiting for user specific information, and because of the relatively general nature of the user specific information. Consequently it is not likely to be of sufficient value to justify any additional ground or space asset modifications to accommodate this use of a general broadcast system such as the GPS system.

SUMMARY OF THE INVENTION

It is an object of the present invention to provide a system and method to individualized broadcasts on a general use broadcast frequency.

It is a further object of the present invention to provide simple and low cost system and method to individualized broadcasts on a general use broadcast frequency.

It is another object of the present invention to provide a system and method to individualize GPS broadcasts to specific users.

It is still another object of the present invention to provide a system and method to individualize direct TV broadcasts.

To achieve the above objects, the present invention provides a method of individualizing a general broadcast signal, comprising: combining a user identifier and a message to form a first message layer signal; encoding the first message layer signal; combining a first source identifier with the encoded first message layer signal to form a second message layer signal; and encoding the second message layer signal. The present invention also provides a system for individualizing a general broadcast signal, comprising: first logic apparatus, operatively connected to receive and to concatenate a user identifier and a message to form a first message layer signal; first encoder, operatively connected to first logic apparatus to encode the first message layer signal; second logic apparatus, operatively connected to receive and concatenate a first source identifier with the encoded first message layer signal to form a second message layer signal; and second encoder, operatively connected to the second logic apparatus to encode the second message layer signal.

DETAILED DESCRIPTION OF THE PREFERRED EMBODIMENTS

Figure 1:
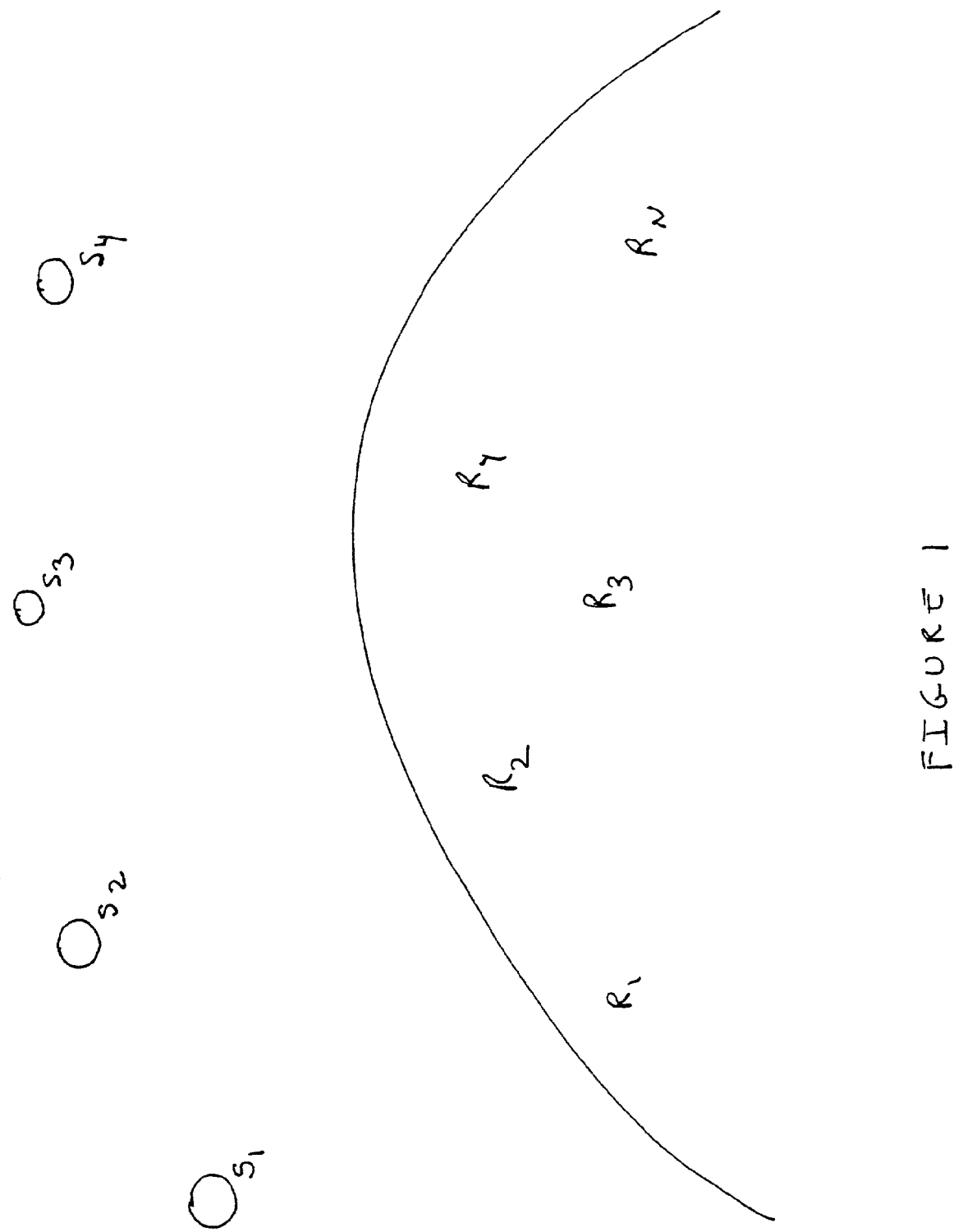
FIG. 1 is a schematic diagram illustrating a general broadcast system.

FIG. 1 is a schematic diagram illustrating a general broadcast system. In FIG. 1, $S_1$, $S_2$, $S_3$, and $S_4$ represent four satellites of a satellite constellation that are visible to receivers $R_1$, $R_2$, $R_3$ ... $R_N$. In the case of a GPS satellite constellation, the satellites, $S_1$, $S_2$, $S_3$, and $S_4$, broadcast on the same frequency. They use a code-division multiplex access (CDMA) scheme to allow the multiple broadcasts on the same frequency to be distinguished and used by each of the GPS receivers.

The GPS implementation of CDMA is different than the approach used in conventional telecommunications, such cellular telephony. Cell phone systems typically use CDMA to allow a single broadcast frequency band to be used by multiple receivers simultaneously. The single broadcast frequency band includes multiple independent data streams decodable only by a specific user. A dual implementation of CDMA using both approaches retains the generality of a general broadcast system while allowing an expansion of a general broadcast system to include user specific broadcasts. In the case of the GPS system, the combination retains the generality and functionality of the GPS position and timing service, and provides user specific broadcasts.

The GPS system is discussed herein is presented merely as example application of the present invention. The present invention is not limited to either satellite or terrestrial broadcasts, but can be applied to other signal distribution schemes; either wire based or wireless.

Figure 2:
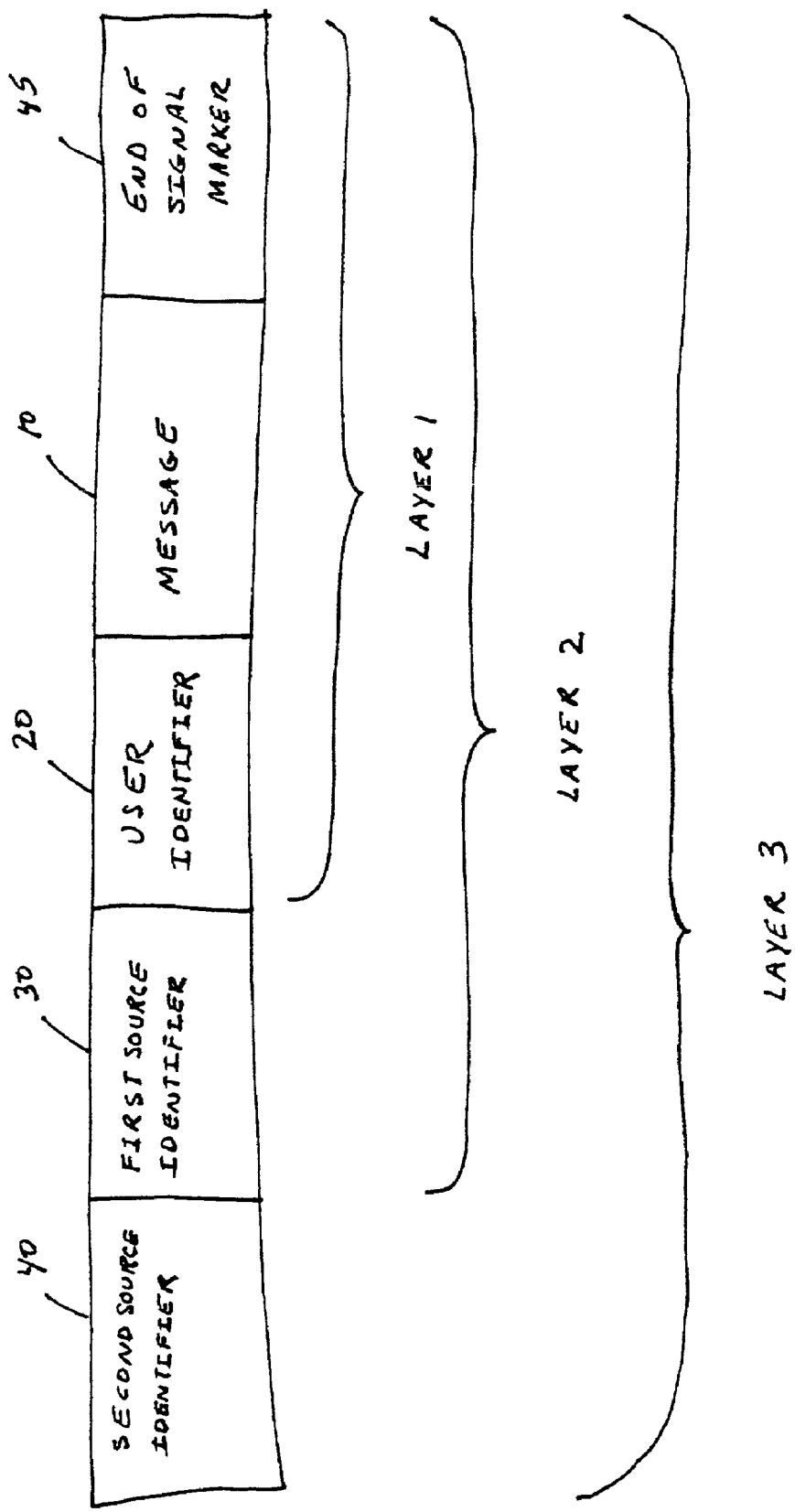
FIG. 2 is a schematic diagram of an exemplary message format in accordance with the present invention.

FIG. 2 is a schematic diagram of an exemplary message format in accordance with the present invention. FIG. 2 illustrates three message layers although in accordance with the present invention two or more layers can be used. In FIG. 2, a message, 10, is destined for a user specified by a user identifier, 20. As shown in FIG. 2, the user identifier, 20, and message are combined in a concatenated fashion to form a first message layer signal. In the first message layer signal, the user identifier could be, for example, combined with a packet sequence number or a forward error correction (FEC) code. The FEC code typically comprises additional bits that accompany the message.

In accordance with the present invention, the first message layer signal is encoded and combined with a first source identifier, 30. FIG. 2 shows the encoded first message layer signal being combined in a concatenated fashion to form a second message layer signal. The first source identifier, 30, could be, for example, a satellite channel identifier. In accordance with the present invention, the second message layer signal is then encoded. The encoded second message layer signal can then be combined with an additional, second identifier, 40, and subsequently encoded in the same manner as the first and second message layer signals. The second identifier, 40, could be, for example, a satellite identifier. In a preferred embodiment of the present invention, the encoding of the various message layers includes the well known code division multiples access encoding. FIG. 2 also shows the use of an end of signal marker 45. The marker 45 can comprise, for example, a last packet flag.

Figure 3:
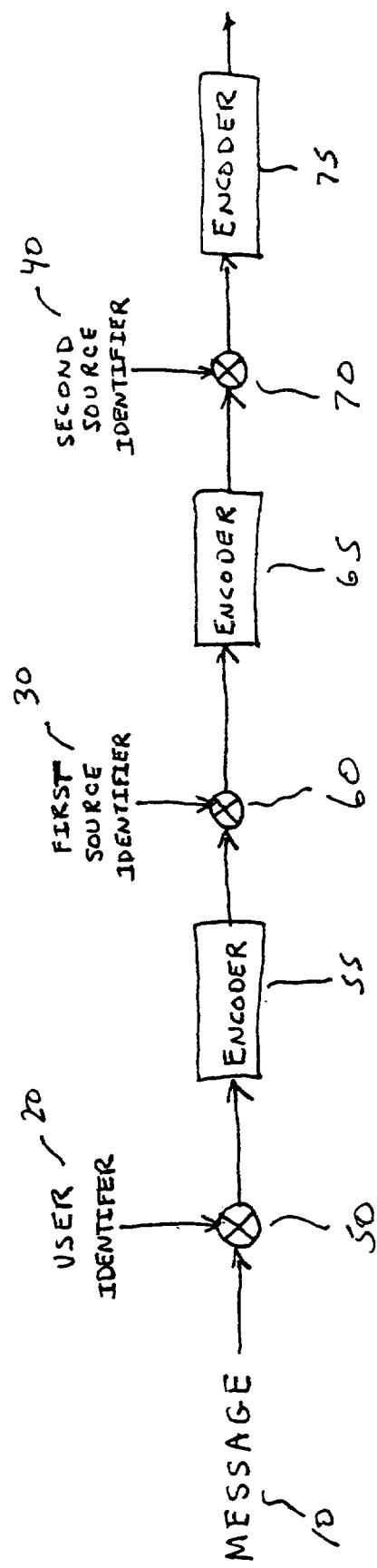
FIG. 3 is a schematic diagram of an exemplary system in accordance with the present invention.

FIG. 3 is a schematic diagram of an exemplary system embodying the present invention. In FIG. 3, a first logic apparatus, 50, receives the message, 10, and the user identifier 20. In accordance with the exemplary message format shown in FIG. 2, the first logic apparatus, 50, concatenates the user identifier 20 and the message, 10, to form the first message layer signal. The first logic apparatus, 50, can comprise, for example, a processor, a programmable logic array ("PLA"), discrete logic, or a portion of an application specific integrated circuit ("ASIC").

Referring to FIG. 3, the first message layer signal is then applied to a first encoder, 55. In a preferred embodiment of the present invention, the first encoder, 55, comprises a CDMA encoder. The first encoder, 55, can comprise, for example, a processor, a programmable logic array, discrete logic, or a portion of an application specific integrated circuit. The encoded first message layer signal is then applied to a second logic apparatus, 60. In accordance with the exemplary message format shown in FIG. 2, the second logic apparatus, 60, concatenates the first source identifier 30 and the encoded first message layer signal, to form the second message layer signal. As with the first logic apparatus, 50, the second logic apparatus can comprise, for example, a processor, a programmable logic array, discrete logic, or a portion of an application specific integrated circuit. The second message layer signal is then applied to a second encoder 65. In a preferred embodiment of the present invention, the second encoder, 65, comprises a CDMA encoder. If desired, the second encoder 65 can have, or can comprise the same structure as the first encoder, 55. As shown in FIG. 3, the encoded second message layer signal is combined in a third logic apparatus, 70, and encoded in a third encoder 75 to form a third message layer signal.

In accordance with the present invention the first logic apparatus, 50, the first encoder, 55, the second logic apparatus, 60, the second logic apparatus, 60, the second encoder 65, the third logic apparatus, 70, and the third encoder 75 can comprise a single processor, PLA, ASIC, or discrete circuits. As will be understood by those skilled in the are, the particular implementation of these elements depends upon the application.

Figure 4:
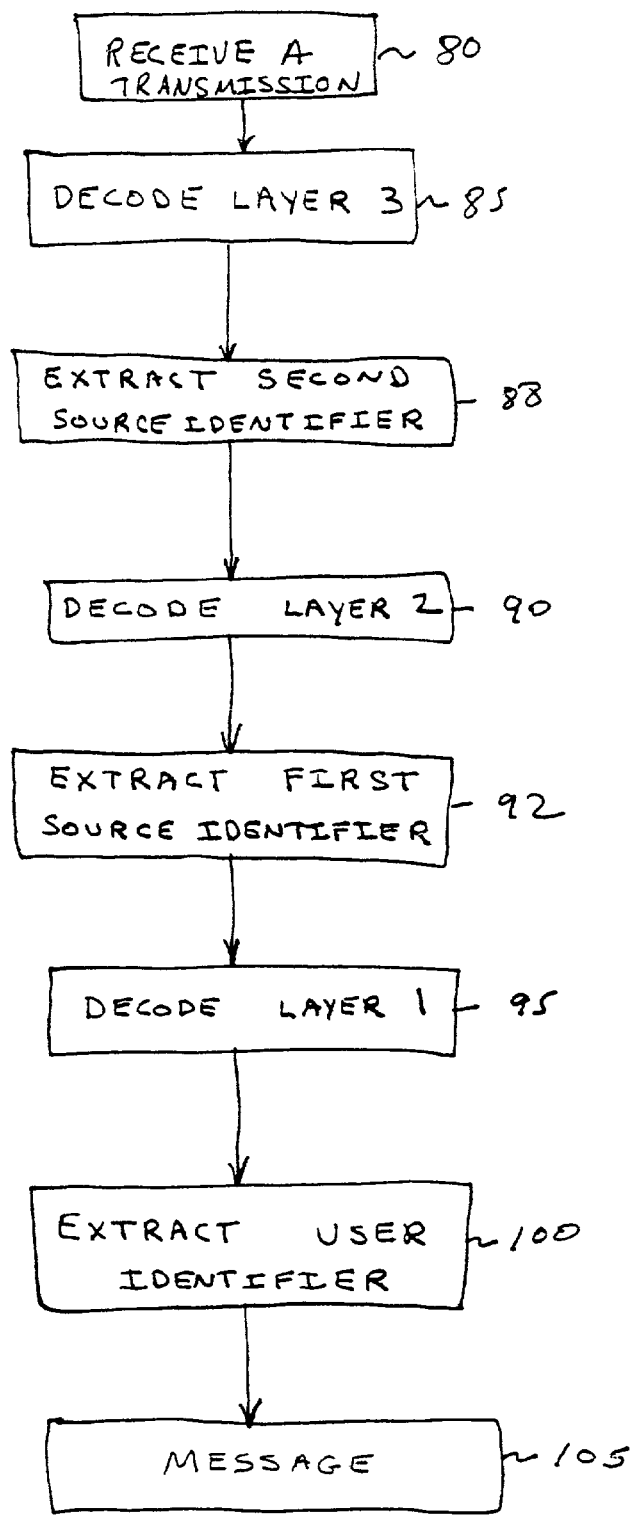
FIG. 4 is an exemplary flow chart illustrating logic flow of processing in accordance with the present invention.

FIG. 4 is an exemplary flow chart illustrating logic flow of processing in accordance with the present invention. In step 80, a transmission is received by, for example, a processor programmed to received digital signals, such as a signal having the format shown in FIG. 2. Layer 3 of the received transmission (FIG. 2) is then decoded, in step 85, using the second source identifier 40. The second source identifier 40 is then extracted/stripped off the transmission in step 88. As mentioned above, the decoding can comprise CDMA decoding. The decoding can be performed by a processor or a special circuit depending upon the application. In step 90, the layer 2 (FIG. 2) of the transmission is decoded using the first source identifier 30. In Step 92, the first source identifier is extracted/stripped off the transmission. Again, the decoding can be via, for example, CDMA decoding. In step 92 layer 1 of the transmission is decoded using the user identifier 20. The user identifier is extracted/ stripped off the transmission. This leaves, in step 105, the user specific message available for the intended user.

Figure 5:
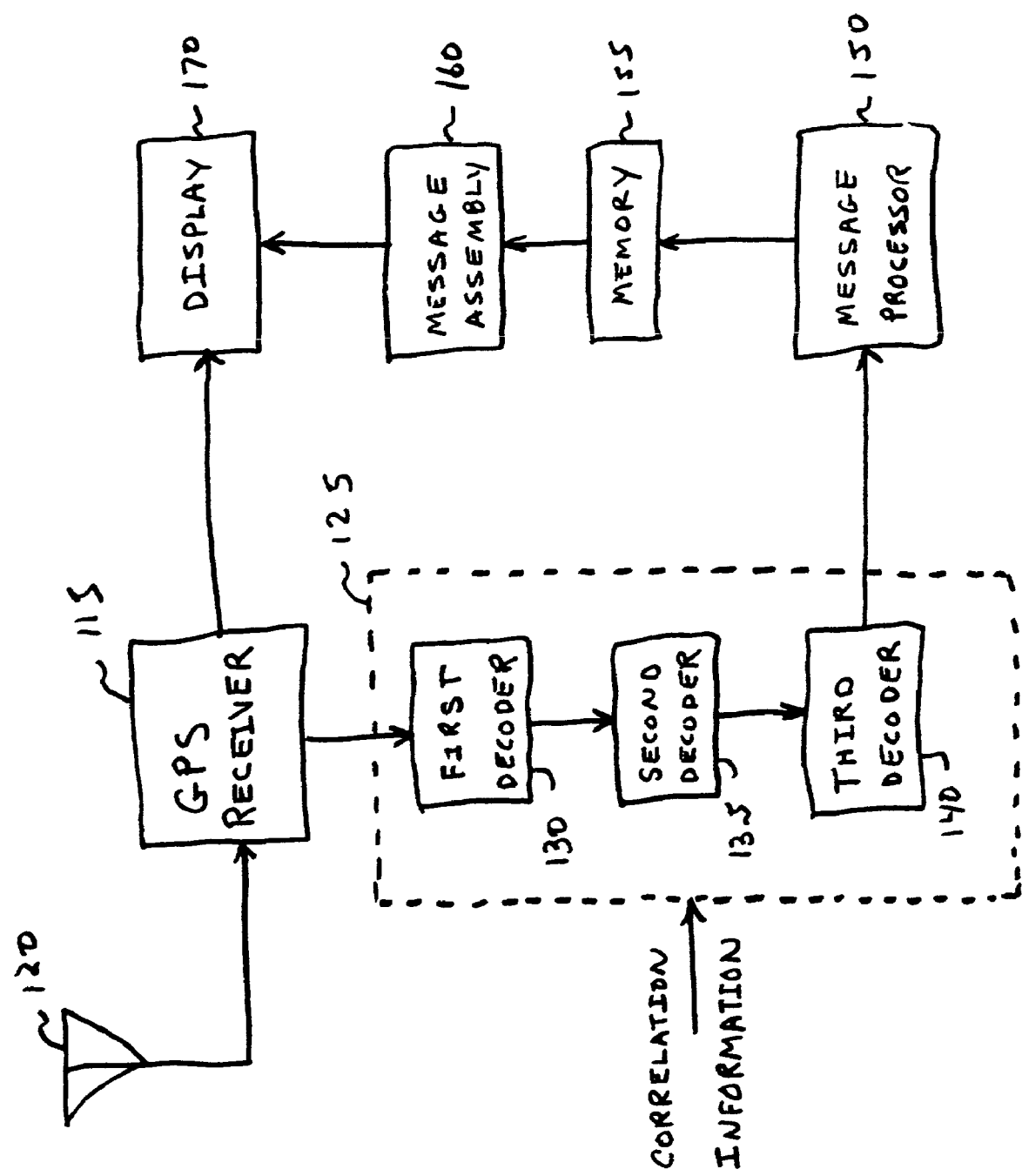
FIG. 5 is a schematic block diagram of an exemplary receiver in accordance with the present invention.

FIG. 5 is a schematic block diagram of an exemplary receiver in accordance with the present invention. FIG. 5 illustrates the present invention employed in conjunction with a known GPS receiver, 115. In FIG. 5, an antenna, 120, receives a general broadcast signal, and applies the received signal to the GPS receiver, 115. The GPS receiver, 115, provides a demodulated version of the general broadcast signal to a correlation section, 125. The demodulated signal comprises, for example, the base band version of the received general broadcast signal.

The correlation section, 125, also receives correlation information. The correlation information can include the first and second source identifiers (30, 40) and the user identifier, 20 shown in FIG. 2. The correlation information can be applied to the correlation section, 125, via manual entry by a user, or automatically via an associated system, such as a flight management system. As those skilled in the art recognize, the mechanism by which the correlation section, 125, receives the correlation information depends upon the particular application in which the present invention is used.

Referring to FIG. 5, a first decoder, 130, in the correlation section, 125, receives the demodulated general broadcast signal. Assuming the general broadcast signal includes the example shown in FIG. 2, the first decoder, 130, decodes using the second source identifier, 40. As shown in the example receiver structure of FIG. 5, the decoded output of the first decoder, 130, is applied to and decoded by a second decoder 135. As discussed above with respect to the encoding process, the number of layers above the user message depends on the application. As those skilled in the art will recognize, the use of three layers discussed herein is for illustration purposes only, and the present invention can be utilized applications using more than or less than the three layers discussed here. As shown in the FIG. 5 example, the decoded output of the second decoder, 135, is applied to and decoded by a third decoder, 140. The output of the decoder, 140, includes a packet of the message, 10, shown in FIG. 2. The first, second, and third decoders (130, 135, 140) can comprise well known CDMA decoders. They can be embodied in integrated circuits, software, or a combination of both. The particular implementation of the decoders is not important to practicing the present invention. It is, as those skilled in the art will recognize, a design choice, depending upon the particular application.

The output of the correlation section, 125, is applied to a message processor, 150. The message processor performs the well known function of converting a packet provided by the correlation section, 125, into a message, 10. The recovered message, 10, is temporarily stored in a memory, 155. Once all of the packets are received, the messages, 10, stored in the memory, 155, are assembled into a user specific message by a message assembly unit 160. Converting packets into messages and assembling individual messages into a completed message (e.g., a user specific message) is well known, the details of which are therefore not repeated here.

In the example of FIG. 5, the assembled user specific message provided by message assembly, 160, can optionally be provided to a display 170. In the case of a GPS receiver, the display, 170, can be the display unit of an ordinary GPS receiver. Alternatively, the assembled user specific message could be automatically applied to another system such as a flight management system. For example, a pilot makes a request of the control tower for specific information. The control tower radios the first and second source identifiers to the pilot who enters that information into the system. As shown in FIG. 5, the information is applied after entry to the correlation section, 125. The requested information is then sent using the correlation information (including the user identifier for the aircraft/pilot making the request). The receiver monitors the general broadcast and, decodes the received signals as outlined above. On receiving a general broadcast with the appropriate correlation information (e.g., first and second source identifiers and user identifier), the user specific message is received assembled and, if desired, displayed. The user specific message could, as noted above, be applied to a flight management system on board the aircraft. In this example, the second source identifier, 40, would include a satellite identifier, and the first source identifier, 30, would include a satellite channel identifier.

What is claimed is:

1. A method of individualizing a general broadcast signal, comprising:
    combining a user identifier and a message to form a first message layer signal;
    encoding the first message layer signal;
    combining a first source identifier with the encoded first message layer signal to form a second message layer signal; and
    encoding the second message layer signal.

2. A method of individualizing a general broadcast signal according to claim 1, further comprising:
    combining a second source identifier with the encoded second message layer signal to form a third message layer signal;
    encoding the third message layer signal.

3. A method of individualizing a general broadcast signal according to claim 1, wherein the encoding of at least one of the first and second message layer signals includes code division multiples access encoding.

4. A method of individualizing a general broadcast signal according to claim 2, wherein the encoding of the third message layer signals includes code division multiples access encoding.

5. A method of individualizing a general broadcast signal according to claim 1, further comprising:
    receiving the encoded second message layer signal;
    decoding the encoded second message layer signal; and
    decoding the encoded first message layer signal.

6. A method of individualizing a general broadcast signal according to claim 2, further comprising:
    receiving the encoded third message layer signal;
    decoding the encoded third message layer signal; and
    decoding the encoded second message layer signal;
    decoding the encoded first message layer.

7. A method of individualizing a general broadcast signal according to claim 5, wherein the decoding of at least one of the first and second message layers signals includes code division multiples access decoding.

8. A method of individualizing a general broadcast signal according to claim 6, wherein the decoding of at least one of the first, second, third message layer signals includes code division multiples access decoding.

9. A system for individualizing a general broadcast signal, comprising:
    first logic apparatus, operatively connected to receive and to concatenate a user identifier and a message to form a first message layer signal;
    first encoder, operatively connected to first logic apparatus to encode the first message layer signal;
    second logic apparatus, operatively connected to receive and concatenate a first source identifier with the encoded first message layer signal to form a second message layer signal; and
    second encoder, operatively connected to the second logic apparatus to encode the second message layer signal.

10. A system for individualizing a general broadcast signal according to claim 9, further comprising:
    third logic apparatus, operatively connected to receive and concatenate a second source identifier with the encoded second message layer signal to form a third message layer signal; and
    third encoder, operatively connected to the third logic apparatus to encode the third message layer signal.

11. A system for individualizing a general broadcast signal according to claim 9, wherein the first and second encoders comprise code division multiplex access encoders.

12. A system for individualizing a general broadcast signal according to claim 10, wherein the third encoder comprises a code division multiplex access encoder.

13. A system for individualizing a general broadcast signal according to claim 9, further comprising:
    a general broadcast receiver operatively connected to receive the encoded second message layer signal;
    a first decoder operatively connected to decode the encoded second message layer signal; and
    a second decoder operatively connected to decode the encoded first message layer signal.

14. A system for individualizing a general broadcast signal according to claim 10, further comprising:
    a general broadcast receiver operatively connected to receive the encoded third message layer signal;
    a first decoder operatively connected to decode the encoded third message layer signal;
    a second decoder operatively connected to decode the encoded second message layer signal; and
    a third decoder operatively connected to decode the encoded first message layer.

15. A system for individualizing a general broadcast signal according to claim 13, wherein at least one of the first and second decoders includes a code division multiples access decoder.

16. A system for individualizing a general broadcast signal according to claim 14, wherein at least one of the first, second, third decoders include a code division multiples access decoder.

* * * * *